June 10, 1924.
W. S. PARR
REMOVABLE AND ADJUSTABLE TRACTION RIM
Filed Aug. 23, 1922    2 Sheets-Sheet 1
1,497,634
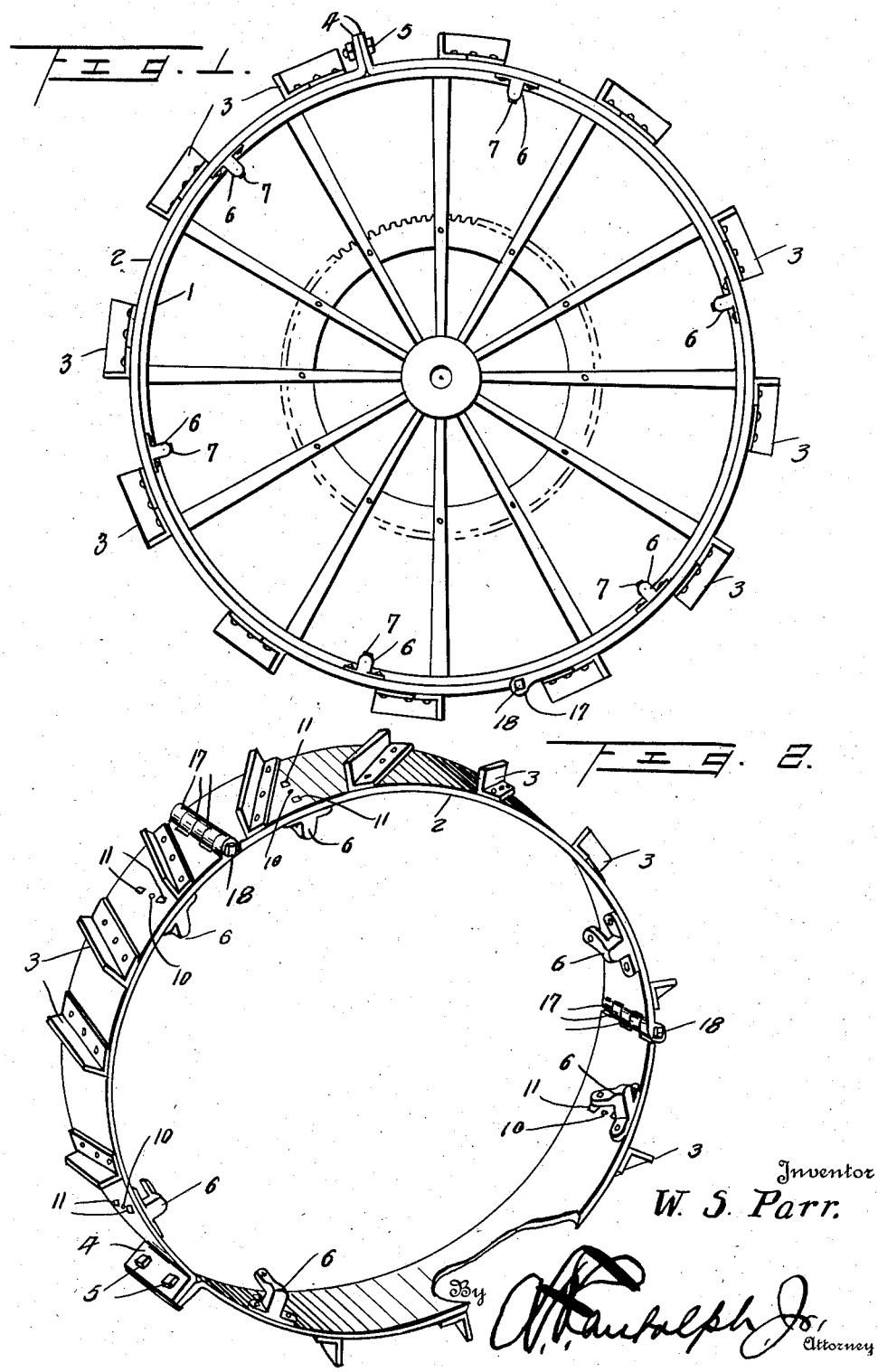
Inventor
W. S. Parr.

June 10, 1924.
W. S. PARR
1,497,634
REMOVABLE AND ADJUSTABLE TRACTION RIM
Filed Aug. 23, 1922  2 Sheets-Sheet 2
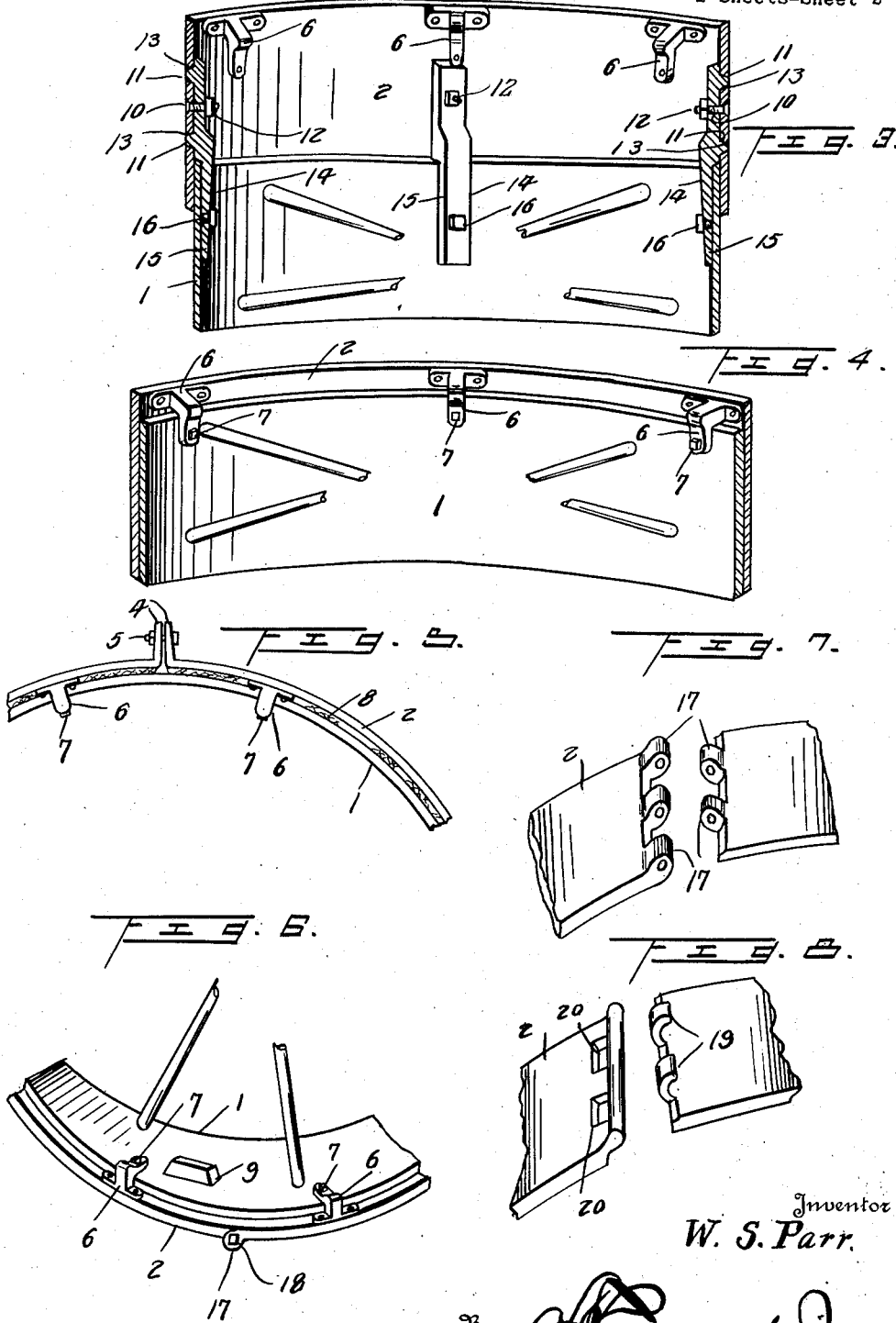

Patented June 10, 1924.

1,497,634

UNITED STATES PATENT OFFICE.

WILSON S. PARR, OF FINDLAY, OHIO.

REMOVABLE AND ADJUSTABLE TRACTION RIM.

Application filed August 23, 1922. Serial No. 583,748.

*To all whom it may concern:*

Be it known that I, WILSON S. PARR, a citizen of the United States, residing at Findlay, in the county of Hancock and State of Ohio, have invented certain new and useful Improvements in Removable and Adjustable Traction Rims; and I do hereby declare the following to be a full, clear, and exact description of the invention, such as will enable others skilled in the art to which it appertains to make and use the same.

The invention relates to tractors and more particularly to the rim of the tractor wheel, which may be removed or adjusted as required to meet existing conditions.

When traveling over improved highways, it is desirable to omit the lugs or cleats of the tractor wheels, whereby to obviate injury to the surface of the road, and when operating over plowed ground or soft surfaces, it is desirable to have as broad a tread as possible to prevent sinking of the tractor wheels and stalling of the tractor.

The present invention provides a rim for the drive wheel of a tractor which may be easily removed or placed in position and adjusted laterally to vary the width of the tread as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a tractor wheel provided with a removable rim embodying the invention, Figure 2 is a perspective view of a modified form of rim, Figure 3 is a detail perspective view of portions of the tractor wheel rim and the removable rim, showing the latter adjusted laterally to increase the tread, Figure 4 is a detail view in perspective similar to Figure 3, showing the normal position of the removable rim relative to the rim of the tractor wheel, Figure 5 is a detail view, showing a packing interposed between the two rims to prevent possible slipping of the removable or traction rim, Figure 6 is a detail view, showing a positive connection between the two rims to preclude any movement of the traction rim, and Figures 7 and 8 are detail views, showing different forms of hinge joint between the sections of the traction rim.

Corresponding and like parts are referred to in the following description and designated in the several views of the drawings by like reference characters.

The numeral 1 designates the rim of a tractor wheel which, in the present instance, is devoid of traction lugs or cleats. The numeral 2 designates the removable and adjustable traction rim which is adapted to be secured upon the rim 1. The rim 2 is preferably of sectional formation and the sections are hingedly connected to facilitate the placing of the rim 2 in position or the dismounting thereof. As indicated in Figure 1, the rim 2 comprises two similar or like sections and, as indicated in Figure 2, the rim comprises three sections. It will thus be understood that the number of sections is immaterial and will depend largely upon the particular size and construction of the rim. Cleats or lugs 3 are applied to the outer or tread side of the rim 2 and may be of any preferred design and secured to the rim as found most advantageous. The ends of the rim 2 bordering upon the separable joint are outturned as indicated at 4, and the outturned ends 4 are apertured to receive bolts 5 whereby the rim is contracted and drawn close about the rim 1 to secure the rim 2 in the required position. Clips 6 are riveted or otherwise secured to an edge portion of the rim 2 upon the inner side thereof and are adapted to engage an edge portion of the rim 1 as indicated most clearly in Figure 4. Clamp screws 7 threaded into the ends of the clips 6 are adapted to engage the rim 1 and assist materially in securing the rim 2 in the required position.

The friction resulting from drawing the rim 2 close about the rim 1 is ordinarily sufficient to hold the rim 2 in place. The clips 6 and clamp screws 7 provide additional means for securing the rim 2 on the rim 1. As indicated in Figure 5, a packing 8 may be interposed between the two rims 1 and 2 to increase the frictional engagement and prevent possible displacement or movement of the rim 2. The packing 8 may consist of any material such as usually employed as brake lining for motor vehicles. As indicated in Figure 6, a lug 9 extends inwardly from the rim 2 and is adapted to pass through an opening formed in the rim 1, thereby constituting positive means to prevent circumferential or lateral movement of the rim 2.

To provide for lateral adjustment of the rim 2, whereby the effective tread of the tractor wheel may be increased, the rim 2 is provided at intervals in its circumferential length with openings 10 and 11, the openings 10 being intermediate the openings 11 and adapted to receive bolts 12 or analogous fastenings. The openings 11 are adapted to receive lugs 13 forming a part of brackets 14 which are secured to the rim 2 and project beyond an edge thereof to engage the inner side of the rim 1 as shown most clearly in Figure 3. The projecting ends 15 of the brackets 14 receive clamp screws 16 which engage the inner side of the rim 1 and secure the rim 2 in the adjusted position. An edge portion of the rim 1 is clamped between an edge portion of the rim 2 and the projections 15 of the brackets 14. In this manner provision is had for increasing the tread of the tractor wheel to prevent its sinking into plowed ground or soft surfaces. In the normal adjustment of the rim 2, as indicated most clearly in Figure 4, the brackets 14 are removed.

The sections comprising the traction rim may be hinged in any preferred way. As shown in Figure 7, matching knuckles 17 are provided at the hinge end and receive the pintle 18. As shown in Figure 8, hooks 19 are provided at the end of one section and engage openings 20 provided at the adjacent end of the companion section.

What is claimed is:

1. A traction rim having pairs of perforations, brackets carrying lugs fitted in said perforations, bolts passing through said brackets and traction rim, said brackets having their free portions offset inwardly and projecting beyond an edge of the traction rim to receive an edge portion of a tractor wheel between said projecting portions and the adjacent edge portion of the traction rim, and means carried by the free ends of said brackets and adapted to engage the tractor wheel rim and hold the traction rim in place.

2. A traction rim adapted to be fitted about a tractor wheel and project at one side thereof, brackets secured to the inner wall of said rim and having arms projecting laterally of the rim in the direction of the inner edge thereof, said bracket arms being spaced from the inner wall of the traction rim and adapted to receive a tractor wheel rim between themselves and the inner wall of said traction rim when the traction rim is fitted about a tractor wheel, said brackets acting as stops to limit the inward movement of the traction rim on the tractor wheel, and means carried by the free ends of each of said bracket arms and adapted to engage the inner wall of the tractor wheel rim to secure the traction rim about the tractor wheel rim.

In testimony whereof I affix my signature in presence of two witnesses.

WILSON S. PARR.

Witnesses:
 IRA BUSHONG,
 CHARLES E. JORDAN.